United States Patent
Rangeley

(10) Patent No.: US 8,032,771 B2
(45) Date of Patent: Oct. 4, 2011

(54) SYSTEMS AND METHODS FOR CONTROLLING POWER CONSUMPTION OF POWER SUPPLY OF ELECTRONIC DEVICES BY SWITCHING BETWEEN MODES BASED ON CONTROL SIGNALS

(75) Inventor: Julian Rangeley, Bradford (GB)

(73) Assignee: Eldon Technology Limited, Steeton (GB)

( * ) Notice: Subject to any disclaimer, the term of this patent is extended or adjusted under 35 U.S.C. 154(b) by 436 days.

(21) Appl. No.: 12/199,477

(22) Filed: Aug. 27, 2008

(65) Prior Publication Data

US 2010/0058083 A1 Mar. 4, 2010

(51) Int. Cl.
G06F 1/32 (2006.01)
(52) U.S. Cl. ............ 713/320; 713/310; 713/324
(58) Field of Classification Search .......... 710/300–340; 713/300–340
See application file for complete search history.

(56) References Cited

U.S. PATENT DOCUMENTS

| | | | | |
|---|---|---|---|---|
| 6,321,029 | B1 * | 11/2001 | Kuo | 388/800 |
| 7,386,742 | B2 * | 6/2008 | Hirai | 713/300 |
| 7,472,296 | B2 * | 12/2008 | Kato et al. | 713/320 |
| 7,500,127 | B2 * | 3/2009 | Fleck et al. | 713/324 |
| 7,672,156 | B2 * | 3/2010 | Park et al. | 365/163 |
| 7,707,442 | B2 * | 4/2010 | Kato | 713/322 |
| 7,765,416 | B2 * | 7/2010 | Zhou et al. | 713/320 |

* cited by examiner

Primary Examiner — Raymond Phan
(74) Attorney, Agent, or Firm — Dorsey & Whitney LLP

(57) ABSTRACT

A method of controlling power consumption of a power supply of a device may include receiving a control signal that switches the device between first and second modes of operation; and switching the supply between corresponding first and second modes based on the received signal, the supply being configured to draw different amounts of power in the first and second modes. A power supply for supplying electrical power to a device may include power supply mode circuitry configured to place the supply into one of at least two power modes: a first mode in which the supply draws a first amount of power and a second mode in which the supply draws less power. An electronic device may include circuitry that generates a control signal, based on which the power supply mode circuitry selectively places the electrical power supply into one of a plurality of power modes.

18 Claims, 8 Drawing Sheets

SYSTEMS AND METHODS FOR CONTROLLING POWER CONSUMPTION OF POWER SUPPLY OF ELECTRONIC DEVICES BY SWITCHING BETWEEN MODES BASED ON CONTROL SIGNALS

CROSS-REFERENCE TO RELATED APPLICATION

This application is related to U.S. Nonprovisional patent application Ser. No. 12/056,819, entitled "Reduction of Power Consumption in Remote Control Electronics," filed on Mar. 27, 2008, to U.S. Nonprovisional patent application Ser. No. 12/056,520, entitled "Systems and Methods for Controlling the Power State of Remote Control Electronics," filed on Mar. 27, 2008, and to U.S. Nonprovisional patent application Ser. No. 12/175,897, entitled "Systems and Methods for Controlling Power Consumption in Electronic Devices," filed on Jul. 18, 2008, each of which is hereby incorporated by reference in its entirety.

FIELD OF THE INVENTION

The present invention relates generally to electronic devices, and more particularly to systems and methods for controlling power consumption of a power supply of an electronic device.

BACKGROUND ART

Advancements in consumer electronic devices have led to a wide variety of such devices that may be powered from an AC power source, such as an electrical outlet in a home. Many of such devices are placed in an off/standby mode when turned off. In the off/standby mode, these devices typically continue to require some power and draw some current.

Some devices may continue to perform certain operations even when turned off or in a standby mode. For example, a set top box (STB) may receive programming signals and other information related to the programming and/or the operation of the STB while on. It may be monitoring its receiver or other input even when the STB is in an off/standby mode. As one particular example, programming information in the form of an electronic program guide (EPG) and/or firmware updates may be received by the STB when in the off/standby mode so that the EPG and/or firmware of the STB may be updated for use when the STB is next turned on by the user.

Other devices may be completely idle and perform no operations when turned off or in a standby mode, possibly other than to "wait" for a command to turn on. However, in either case, the power supply of such electronic devices may continue to consume power or energy whenever connected to a power source such as an electrical outlet, for example, plugged in. This may be the case regardless of the operating mode or state of the electronic device.

BRIEF SUMMARY

For an electronic device that includes a power supply, this disclosure contemplates a low or reduced-power mode of operation of the power supply that is employed when the electronic device is in a low or reduced-power mode or state, such as turned off or in a standby mode, a sleep mode or a vacation mode. Thus, this disclosure contemplates a power supply that includes a high or full-power mode of operation and a low or reduced-power mode of operation. In particular, this disclosure contemplates such a mode of operation for a plug-top power supply, that is, a power supply configured to plug into an electrical outlet, although other types of power supplies are not excluded, such as inductive or even hard-wired. It should be understood that an "electronic device" as used herein is intended to encompass any device that operates substantially based on electronics and may employ a power supply for obtaining power from an electrical source.

This disclosure contemplates such a mode of operation of the power supply for electronic devices that continue to perform certain operations when turned off or in a standby mode, as well as electronic devices that perform no operations when turned off or in a standby mode. The low or reduced-power mode of operation of the power supply may be automatically invoked when the electronic device is placed into a low or reduced-power state, such as an off state or a standby state.

In some embodiments, the low or reduced-power mode of operation of the power supply may place the power supply in a low or reduced-power state in which the power supply draws a relatively low, fixed amount of power, less than an amount of power the power supply draws in the high or full-power mode of operation. This may be appropriate, for example, for the off and/or standby modes of an electronic device that performs no operations when in the off and/or standby modes.

Further, the low or reduced-power mode of operation of the power supply may provide multiple low or reduced-power states of the power supply. The low or reduced-power mode may provide such states to meet the demands of the low or reduced-power states of the electronic device. For example, the low or reduced-power mode of operation of the power supply may include a first low or reduced-power state and a second low or reduced-power state. In the first low or reduced-power state, the power supply may be configured to draw a relatively low, fixed amount of power, less than an amount of power the power supply draws in the high or full-power mode of operation. In the second low or reduced-power state, the power supply may be configured to draw a fixed amount of power greater than in the first low or reduced-power state, but still less than the amount of power the power supply draws in the high or full-power mode of operation. This may be appropriate, for example, for the off and/or standby modes of an electronic device that performs a limited or reduced number of operations when in the off and/or standby modes, as well as for the "sleep" or "vacation" modes in which the electronic device suspends operations and/or reduces a frequency of operations that are normally performed when the device is off or in a standby mode, such as described in the incorporated patent application Ser. No. 12/175,897. The power supply normally be placed in the first low or reduced-power state when the electronic device is in the off, standby, sleep and/or vacation modes, and placed in the second low or reduced-power state only when the operation(s) to be performed in that mode is/are performed.

Thus, various systems and methods disclosed herein may control power consumption by a power supply of an electronic device. For example, various systems and methods described herein may selectively place a power supply of an electronic device in different states: a first or active state in which the power supply is configured to draw a normal amount of power; and a second or inactive state in which the power supply is configured to draw an amount of power less than the normal amount of power. In some embodiments, the power supply may be selectively placed in a third state in which the power supply is configured to draw an amount of power less than the normal amount of power, but greater than the amount of power drawn in the second state.

It should be understood that the amount of power that the power supply is configured to draw in its various states may be fixed or variable, as appropriate or desired. For example, the first or active state of the power supply may correspond to an on state or mode of the electronic device. As such, the power supply may be configured to draw an amount of power that may vary based on demand by the electronic device, with the power supply drawing a relatively high minimum amount of power sufficient to meet a minimum amount of power demanded by the electronic device in its on mode and/or to meet instantaneous increases in demand by the electronic device.

The second or inactive state of the power supply may correspond to an off state or mode, a standby state or mode, a sleep state or mode and/or a vacation state or mode of the electronic device. For an electronic device that performs no operations in that state of the device, the power supply may be configured to draw a relatively low fixed amount of power in the second state. For an electronic device that performs a limited or reduced number of operations in that state of the device, the power supply may be configured to draw a relatively low fixed amount of power sufficient to meet the demands of the electronic device for performing the operation (s). Alternatively, the power supply may be configured to draw an amount of power that may vary based on demand by the electronic device, with the power supply drawing a relatively low amount of power sufficient to meet a minimum amount of power demanded by the electronic device in that mode and/or to meet instantaneous increases in demand by the electronic device as required by the operation(s).

The third state may also correspond to an off state or mode, a standby state or mode, a sleep state or mode and/or a vacation state or mode of the electronic device to provide two different states of the power supply for that state of the device. For example, the power supply may be configured to draw a relatively low fixed amount of power in the second state, when no operations are performed by the device. In the third state, the power supply may be configured to draw a relatively low fixed amount of power greater than the amount of power drawn in the second state, when one or more of the limited/reduced number of operations are performed.

One embodiment may take the form of a method of controlling power consumption of an electrical power supply of an electronic device. The method may include: receiving a control signal that switches the electronic device between first and second modes of operation; and switching the electrical power supply between corresponding first and second modes based on the received control signal, wherein the electrical power supply is configured to draw different amounts of power in the first and second modes.

In some embodiments, the first mode of operation of the electronic device may be an on mode and the second mode of operation of the electronic device may be an off mode or a standby mode. In other embodiments, the second mode of operation of the electronic device may be a sleep mode or a vacation mode.

In some embodiments, the first mode of the electrical power supply may be a full-power mode and the second mode of the electrical power supply may be a reduced-power mode. In such embodiments, the electrical power supply may have at least a first power state in the first mode and may have a second power state and a third power state in the second mode. In such case, the method may include switching the electrical power supply between the second power state and the third power state based on performance of an operation by the electronic device in the second mode of operation.

In some embodiments, the electrical power supply may be configured to draw a relatively low amount of power in the second power state and may be configured to draw an amount of power in the third state greater than the relatively low amount of power drawn in the second power state.

In some embodiments, the method may include providing the control signal via an electrical connection between the electronic device and the electrical power supply, wherein the electrical connection is in addition to an electrical connection that carries power from the electrical power supply to the electronic device. In other embodiments, the method may include providing the control signal via an electrical connection between the electronic device and the electrical power supply, wherein the electrical connection carries power from the electrical power supply to the electronic device.

Another embodiment may take the form of an electrical power supply for supplying electrical power to an electronic device. The electrical power supply may include power supply mode circuitry configured to place the electrical power supply into one of at least two power modes, wherein the at least two power modes include a first power mode in which the power supply is configured to draw a first amount of power and a second power mode in which the power supply is configured to draw a second amount of power less than the first amount of power.

In some embodiments, the first power mode may be a full-power mode and the second power mode may be a reduced-power mode.

In some embodiments, the power mode circuitry may be configured to switch the electrical power supply between power modes based on a first control signal from the electronic device. In such embodiments, the electrical power supply may include: a first electrical connection configured to be connected to the electronic device to carry power from the electrical power supply to the electronic device; and a second electrical connection configured to be connected to the electronic device to receive the first control signal from the electronic device.

In some embodiments, the electrical power supply may have at least a first power state in the first power mode and may have a second power state and a third power state in the second power mode. In such embodiments, the power supply mode circuitry may be configured to switch the electrical power supply between the second power state and the third power state based on a second control signal from the electronic device. In some embodiments, the second control signal may correspond to performance of an operation by the electronic device while the electrical power supply is in the second power mode. In some embodiments, the electrical power supply may be configured to draw a relatively low amount of power in the second power state and may be configured to draw an amount of power in the third state greater than the relatively low amount of power drawn in the second power state.

Another embodiment may take the form of an electronic device. The electronic device may include: an electrical power supply; power supply mode circuitry configured to selectively place the power supply into one of a plurality of power modes in which the electrical power supply is configured to draw different amounts of power; and circuitry configured to generate a first control signal; wherein the power supply mode circuitry is configured to selectively place the electrical power supply into one of the plurality of power modes based on the first control signal. In some embodiments, the electronic device may also include communication circuitry configured to provide a signal based on the first control signal to the power supply mode circuitry.

In some embodiments, the circuitry may generate the first control signal based on the electronic device being switched between a first mode of operation and a second mode of operation in which the electronic device is configured to perform fewer operations that in the first mode of operation. In such embodiments, the first mode of operation may be an on mode and the second mode of operation may be an off mode or a standby mode. In other embodiments, the second mode of operation may be a sleep mode or a vacation mode.

In some embodiments, the electrical power supply may have at least a first power state in the first mode and may have a second power state and a third power state in the second mode. In such embodiments, the circuitry may be configured to generate a second control signal based on performance of an operation by the electronic device in the second mode of operation, wherein the communication circuitry is configured to provide the second control signal to the power supply mode circuitry and wherein the power supply mode circuitry places the electrical power supply into one of the second power state and the third power state based on the second control signal. In such embodiments, the electrical power supply may be configured to draw a relatively low amount of power in the second power state and may be configured to draw an amount of power in the third state greater than the relatively low amount of power drawn in the second power state.

BRIEF DESCRIPTION OF THE FIGURES

FIG. 4 is a block diagram of an electronic device in conjunction with a plug-top power supply that may be employed in systems and methods described herein.

DETAILED DESCRIPTION

Figure 1:
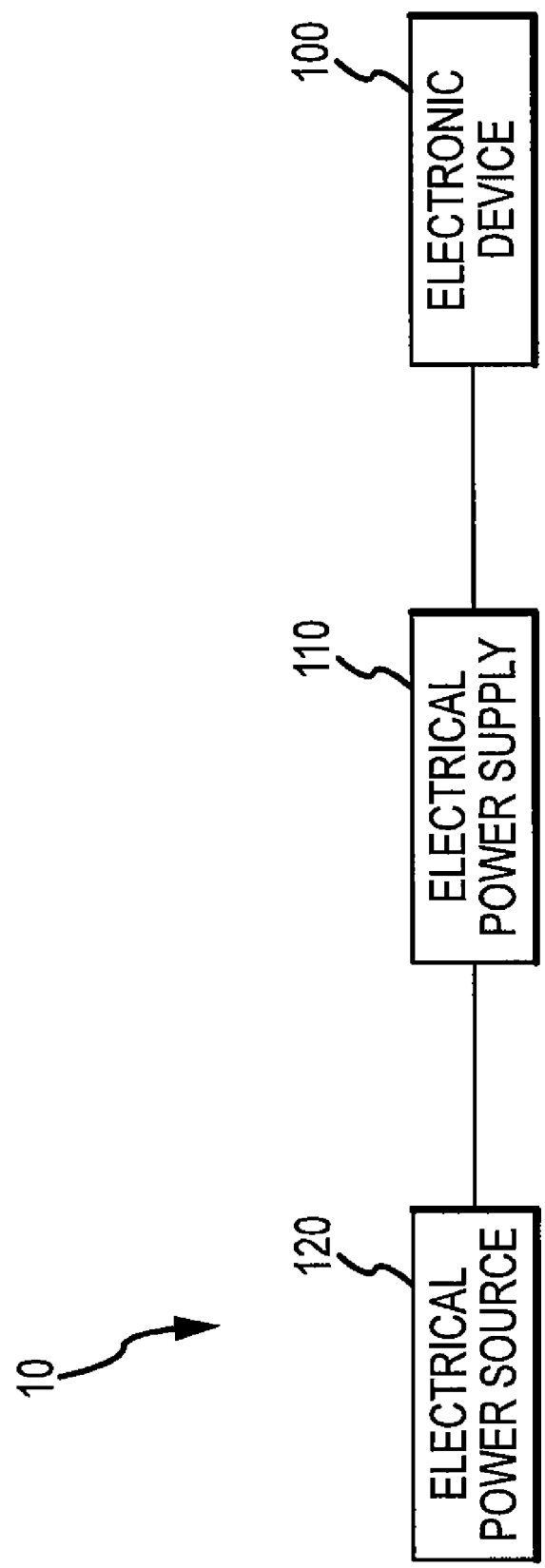
FIG. 1 is a schematic representation of a system for supplying electrical power to an electronic device.

The following describes various embodiments of systems and methods that may be used to reduce power consumption of an electrical power supply of an electronic device. Although specific embodiments may be described in detail, the embodiments disclosed should not be interpreted or otherwise used to restrict the scope of the disclosure provided herein. It should be understood that the following description has broad application, and the discussion of specific embodiments is meant only to provide examples, and is not intended to represent the only embodiments contemplated and encompassed by this disclosure. References to various "circuitry" herein should be understood to include, but not be limited to, wired circuits, traces, integrated circuits, processors, memories, displays, interfaces, and the like that may be employed to receive input and generate output for controlling an electrical power supply and/or an electronic device according to such input, as is well known in the electronic device and electronics arts.

Typically, conventional electrical power supplies may have only a single power mode or mode of operation. The single power mode may be configured to draw different amounts of power based on the demands of the electronic device associated therewith. However, a substantial amount of power may be continuously drawn by the conventional electrical power supply in the single power mode, even when the electronic device is in an off or a standby mode of operation.

As discussed above, various systems and methods disclosed herein may control the power consumption of an electrical power supply of an electronic device by selectively placing the electrical power supply in different power modes in which the electrical power supply is configured to draw respective different amounts of power. Thus, the amount of power drawn by the electrical power supply may be tailored to the anticipated demands of the electronic device, for example, based on different modes of operation of the electronic device.

An electrical power supply should be understood to distinguish from a source of electrical power. An electrical power supply may be, for example, a regulator, a converter and/or a transformer, or the like, that is configured to be placed in electrical communication with a source of electrical power, such as a battery or an electrical outlet, so as to draw electrical power from the electrical power source and provide power to an electronic device associated with the electrical power supply. For example, an electrical power supply that is configured to plug into a standard electrical outlet may be referred to as a plug-top power supply. It should be understood that the plug-top power supply may be a separate device to which an electronic device may be plugged or otherwise electrically connected. In general, it should be understood that an electrical power supply may be a separate device from the electronic device(s) associated therewith, or may be a dedicated device integrated with the electronic device.

As discussed above, conventional power supplies may draw a substantial amount of electrical power even when the electronic device is turned off and/or placed in a standby state. The amount of power drawn by the power supply may be a certain minimum amount regardless of the mode or state of the electronic device. Thus, the amount of power drawn by the power supply may be unrelated to the mode, state or operation of the electronic device, for example, up to a point at which the electronic device demands more power than is supplied by the minimum power drawn by the electrical power supply.

Various systems and methods contemplated by this disclosure may allow the power consumption of an electrical power supply to be varied based on the mode, state and/or operation of the electronic device associated therewith. Embodiments of an electrical power supply may have a plurality of power modes and/or states, for example, to correspond to the modes, states and/or operations of the electronic device. Thus, power consumption by the electronic power supply may be directly related to anticipate and/or known demands of the electronic device corresponding to modes, states and/or operations of the electronic device. Such an approach may reduce or even minimize power consumption by the electrical power supply as compared to a compared to an electrical power supply having only a single mode of operation, and thus a substantial minimum electrical power draw.

In general, embodiments of an electrical power supply contemplated by this disclosure may include additional circuitry as compared to conventional electrical power supplies. The additional circuitry may be, for example, electrical power supply mode circuitry that is configured to selectively place the electrical power supply in one of a plurality of different power modes. Similarly, embodiments of an electrical device contemplated by this disclosure may include additional circuitry as compared to conventional electrical devices. Such additional circuitry may be, for example, communication circuitry that is configured to provide communication from the electronics of the electrical device to the electrical power supply and/or the electrical power supply mode circuitry. It should be understood, however, that such additional circuitry may be embodied by a modification of existing circuitry of the electrical power supply and/or the electronic device and/or may employ such existing circuitry, as appropriate or desired.

An example of an electronic device to which the systems and methods disclosed herein may be applied is a set top box (STB). As discussed above, a STB may monitor its receiver or other input when the STB is in an off/standby mode, and may continue to perform some operations, such as decoding programming signals when in the off/standby mode. It should be understood, however, that the systems and methods disclosed herein may be applied to any electronic device that employs an electrical power supply.

A schematic representation of a system 10 for supplying electrical power to an electronic device 100 is shown in FIG. 1. The electronic device 100 may include or otherwise be in electrical communication with an electrical power supply 110. The electrical power supply 110 may be placed in electrical communication with an electrical power source 120. As is well known in the art, such a system is conventionally employed in electronic devices, particularly electronic devices that are configured to be powered from an electrical outlet that is connected to an electrical power grid. As noted above, the electrical power supply 110 may be configured to modify and/or condition or otherwise render power drawn from the electrical power source 120 to be suitable for use by the electronic device 100, for example, as is well known regarding electrical power supplies. As details regarding the electronic device 100 and the electrical power supply 110 may vary based on the type of electronic device, the purpose and/or desired function(s) of the electrical power supply, and other various matters of design choice, it is not considered necessary to this disclosure to provide such details which would be readily known to those skilled in the art.

Figure 2:
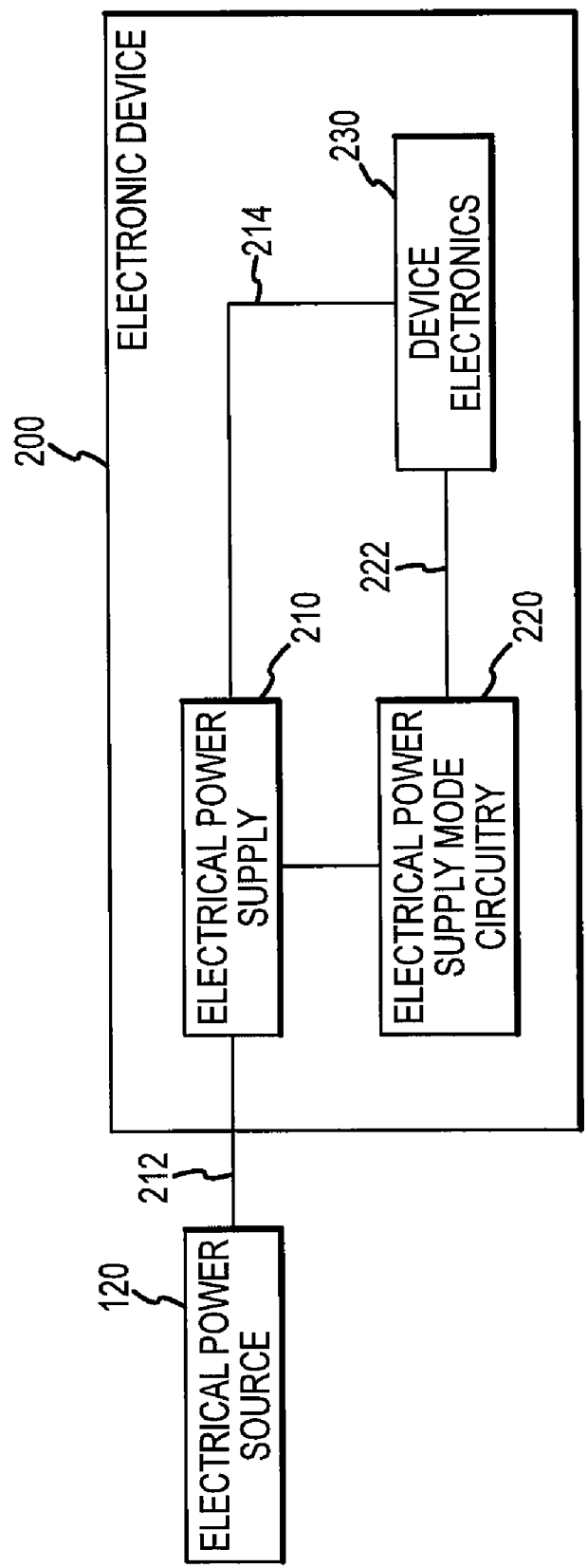
FIG. 2 is a block diagram of an electronic device that may be employed in systems and methods described herein.

FIG. 2 is a block diagram of an electronic device 200 that may be employed in systems and methods described herein. The electronic device 200 may include an electrical power supply 210, electrical power supply mode circuitry 220 and device electronics 230. The device electronics 230 may be any suitable electronics, electrical devices, circuitry and the like that is configured to perform desired operations of the electronic device 200. As noted above, details of the device electronics are not considered necessary to this disclosure as suitable circuitry for performing the operations and/or functions described herein may be developed by those skilled in the art based on this disclosure.

As shown, the electronic device 200 may be placed in electrical communication with the electrical power source 120 via the electrical power supply 210. In particular, an electrical connection or communication link 212, such as an electrical power cord, may be provided to allow the electrical power supply 210 to draw electrical power from the electrical power source 120. The power supply 210 may be placed in electrical communication with the device electronics 230 to provide electrical power to the device electronics 230 via an electrical connection or communication link 214, such as electrical wiring suitable for carrying electrical power.

The electrical power supply 210 may be configured to selectively operate in a plurality of power modes in which the electrical power supply 210 is configured to draw different amounts of power. The configuration of the electrical power supply 210 may be of any suitable design. As such, particular electrical circuitry for the electrical power supply 210 is not considered necessary for those skilled in the art to implement.

The electrical power supply mode circuitry 220 may be configured to select between the plurality of power modes of the electrical power supply 210. For example, the electrical power supply mode circuitry 220 may select or otherwise control the power mode in which the electrical power supply 210 operates based on signals received from the device electronics 230. Alternatively, the electrical power supply mode circuitry 220 may be configured to detect changes in the mode of operation, the state and/or the operations performed by the device electronics 230, and to select or otherwise control the power mode based on the detected changes. In either case, as with the electrical power supply 210, the configuration of the electrical power supply mode circuitry 220 may be of any suitable design. Thus, particular electrical circuitry for the electrical power supply mode circuitry 220 is not considered necessary for those skilled in the art to implement.

Although the electrical power supply mode circuitry 220 is shown separate from the electrical power supply 210 for the sake of explanation, it should be understood that the electrical power supply 210 may include such power supply mode circuitry 220, as appropriate or desired.

Either a signal that causes a change in a mode of operation or a signal that results from a change in a mode of operation may be provided to the electrical power supply mode circuitry 220, for example, via an electrical connection or communication link 222, such as electrical wiring suitable for carrying signals. Alternatively, signals may be provided to the electrical power supply mode circuitry 220 via the electrical connection or communication link 214 carrying power to the device electronics 230.

For example, when power is supplied to the device electronics 230 as a DC signal, an AC signal may be inserted on top of the DC signal and then detected by the electrical power supply 210 or the electrical power supply mode circuitry 220. Although the electrical connection or communication link 214 carrying power to the device electronics 230 is shown as coming directly from the electrical power supply 210 for the sake of clarity, it should be understood that the power from the electrical power supply 210 may reach the device electronics via the electrical power supply mode circuitry 220, or the electrical power supply mode circuitry 220 may otherwise have access to the electrical connection or communication link 214 to allow it to detect the inserted AC signal.

Alternatively, when power is supplied to the device electronics 230 as an AC signal, an AC signal may be inserted and multiplexed at a higher frequency, for example with the AC power signal. Again, the electrical power supply 210 or the electrical power supply mode circuitry 220 may be configured to demultiplex and detect the inserted AC signal.

Regardless of how the signal corresponding to a change in mode of the electronic device is provided and/or detected, the electrical power supply mode circuitry 220 may receive such signal and then control the power mode of the electrical power supply 210 in accordance with the signal, for example, by selecting one of the plurality of power modes of electrical power supply 210.

Similarly, the electrical power supply mode circuitry 220 may receive a signal corresponding to a operations performed by the device electronics 230. For example, when the electronic device 200 is in a "low-power" mode, such as an off mode, a standby mode, a sleep mode, or a vacation mode, the electronic device 200 may still be configure to perform certain operations periodically or otherwise. The electrical power supply mode circuitry 220 may be configured to effectively manage the power mode of the electrical power supply 210 to account for a different power demand by the device electronics for performing the operation(s), while allowing a relatively lower power draw by the electrical power supply 210 for the times during which such operation(s) is/are not being performed.

For example, the electrical power supply mode circuitry 220 may have the electrical power supply 210 placed in a "low-power" mode corresponding to the "low-power" mode of the device electronics 230/electrical device 200. The "low-power" mode of the electrical power supply 210 may include a plurality of power states. A first of the plurality of power states may be a lowest power state for the power mode, that is, the power state that provides the lowest power draw by the electrical power supply 210 in that power mode. The other power state(s) may provide a predetermined increase in power draw by the electrical power supply 210 over the lowest power state or the next lowest power state in that power mode. Thus, when a signal corresponding to a beginning of an operation or operations by the device electronics 230 is received by or detected by the electrical power supply mode circuitry 220, the electrical power supply mode circuitry 220 may place the electrical power supply 210 in a higher power draw state to draw sufficient power to meet the demand of the device electronics 230 required to perform the operation(s). Then, when a signal corresponding to a ending beginning of the operation(s) by the device electronics 230 is received by or detected by the electrical power supply mode circuitry 220, the electrical power supply mode circuitry 220 may return the electrical power supply 210 to its lowest or a lower power draw state to reduce the power draw by the electrical power supply 210, in accordance with the reduced demand by the device electronics 230 upon completion of the operation, one or more of the operations, or all of the operations as the case may be.

Figure 3:
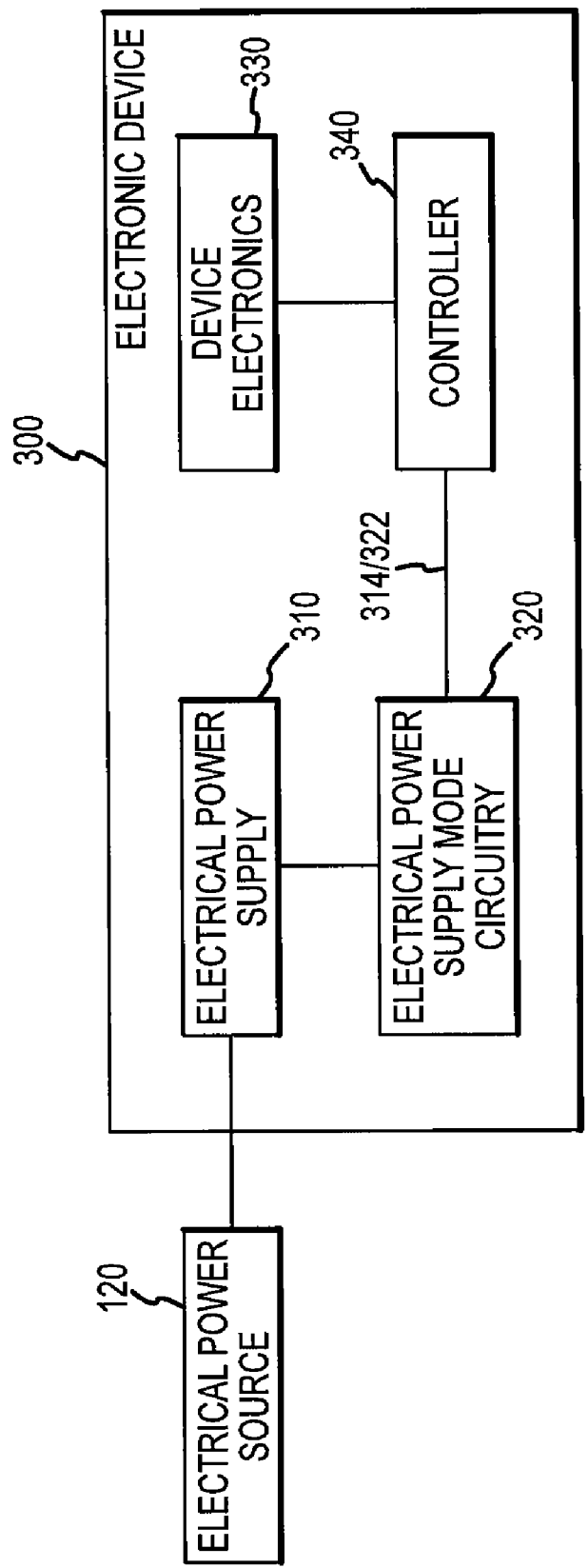
FIG. 3 is another block diagram of an electronic device that may be employed in systems and methods described herein.

FIG. 3 is another block diagram of an electronic device 300 that may be employed in systems and methods described herein. The electronic device 300 may include an electrical power supply 310, electrical power supply mode circuitry 320 and device electronics 330. The electronic device 300 differs from the electronic device 200 described above by also including a controller 340. Although the controller 340 is shown separate from the device electronics 330 for the sake of explanation, it should be understood that the device electronics 330 may include such a controller 340, as appropriate or desired.

The controller 340 may be any suitable processor, microcontroller, circuitry, or the like that is configured to receive a signal to change the mode of operation and/or the state of the device electronics 330/the electronic device 300, and/or to receive a signal to cause the device electronics 330 to perform one or more operations. Thus, the controller 340 may be configured to send such signals to the electrical power supply mode circuitry 320 via an electrical connection or communication link 314, configured to provide electrical power to the device electronics 330, or a separate electrical connection or communication link 322.

As discussed above, the electrical power supply mode circuitry 320 may be configured to select between the plurality of power modes of the electrical power supply 310. In this example, the electrical power supply mode circuitry 320 may select or otherwise control the power mode in which the electrical power supply 310 operates based on signals received from the controller 340. As the controller 340 may be configured to control the modes, states and/or operations of the device electronics 330/the electronic device 300, the controller may be particularly suited to provide signals to the electrical power supply mode circuitry 320 for determining the power mode in which the electrical power supply 310 is to operate. In other words, the controller 340 may provide the same or corresponding signals to the electrical power supply mode circuitry 320 when the controller 340 sends a signal to the device electronics 330 to change mode and/or state, as well as when the controller 340 sends a signal to the device electronics 330 to begin an operation and either sends a signal to the device electronics 330 to end the operation or receives a signal from the device electronics 330 indicating completion of the operation.

Figure 4:
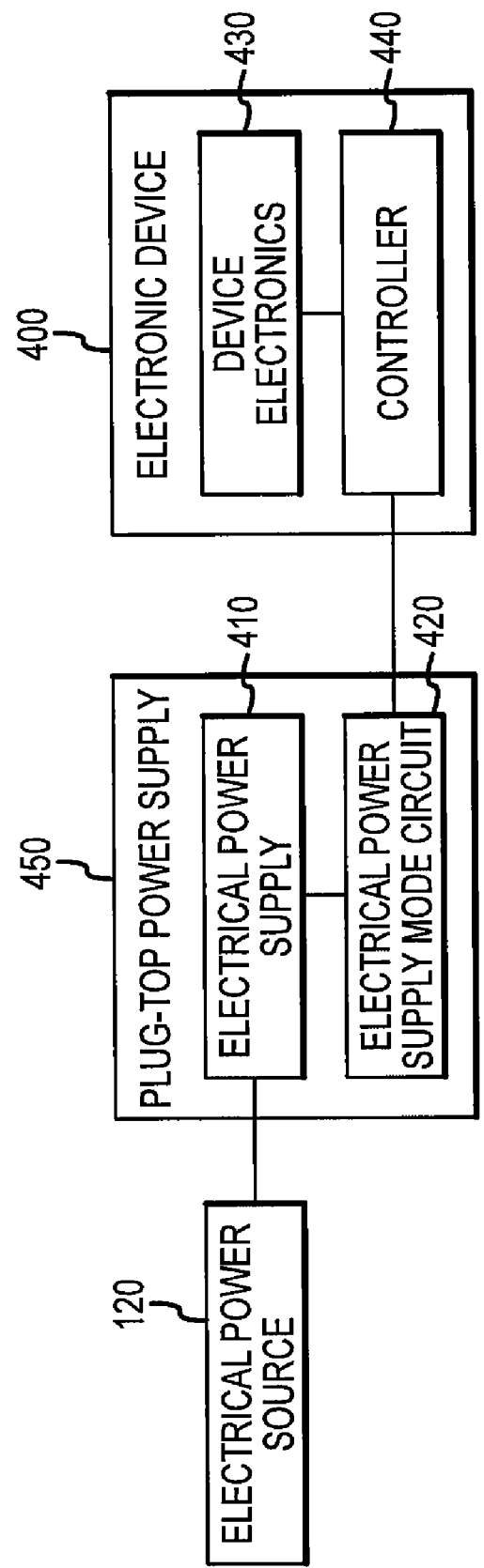
FIG. 4 is

FIG. 4 is a block diagram of an electronic device 400 in conjunction with a plug-top power supply 450 that may be employed in systems and methods described herein. The electronic device 400 may include device electronics 430 and a controller 440, as discussed above with respect to FIG. 3, for example. The electronic device 400 differs from the electronic device 300 described above by not including an electrical power supply or electrical power supply mode circuitry. In this embodiment, the plug-top power supply 450 provides a separate device that includes an electrical power supply 410 and an electrical power supply mode circuit 420. Although the electronic device 400 and the plug-top power supply 450 are illustrated as a single pair of devices, it should be understood that the plug-top power supply 450 may be configured to be associated with and supply power to a plurality of electronic devices, and that the electronic device 400 may be configured to be associated with a plug-top power supply providing a plurality of different outputs or with a plurality of plug-top power supplies, for example, where the electronic device 400 includes a plurality of sections or portions that may operate independently, have different power requirements and/or be in different modes of operation at a given time.

Similar to the discussion above with respect to FIG. 3, the controller 440 may be any suitable processor, microcontroller, circuitry, or the like that is configured to receive a signal to change the mode of operation and/or the state of the device electronics 430/the electronic device 400, and/or to receive a signal to cause the device electronics 430 to perform one or more operations. Thus, the controller 440 may be configured to send such signals, or other signals based on such signals, to the electrical power supply mode circuitry 420 of the plug-top power supply 450 via any suitable electrical connection or communication link. As above, the connection or link may be configured to provide electrical power to the device electronics 430/the electronic device 400, or may be a separate connection or link.

As discussed above, the electrical power supply mode circuit 420 may be configured to select between the plurality of power modes of the electrical power supply 410. In this example, the electrical power supply mode circuit 420 may select or otherwise control the power mode in which the electrical power supply 410 operates based on signals received from the controller 440. As the controller 440 may be configured to control the modes, states and/or operations of the device electronics 430/the electronic device 400, the controller 440 may be particularly suited to provide signals to the electrical power supply mode circuitry 420 for determining the power mode in which the electrical power supply 410 is to operate. In other words, the controller 440 may provide the same or corresponding signals to the electrical power supply mode circuit 420 when the controller 440 sends a signal to the device electronics 430 to change mode and/or state, as well as when the controller 440 sends a signal to the device electronics 430 to begin an operation and either sends a signal to the device electronics 430 to end the operation or receives a signal from the device electronics 430 indicating completion of the operation.

Figure 5:
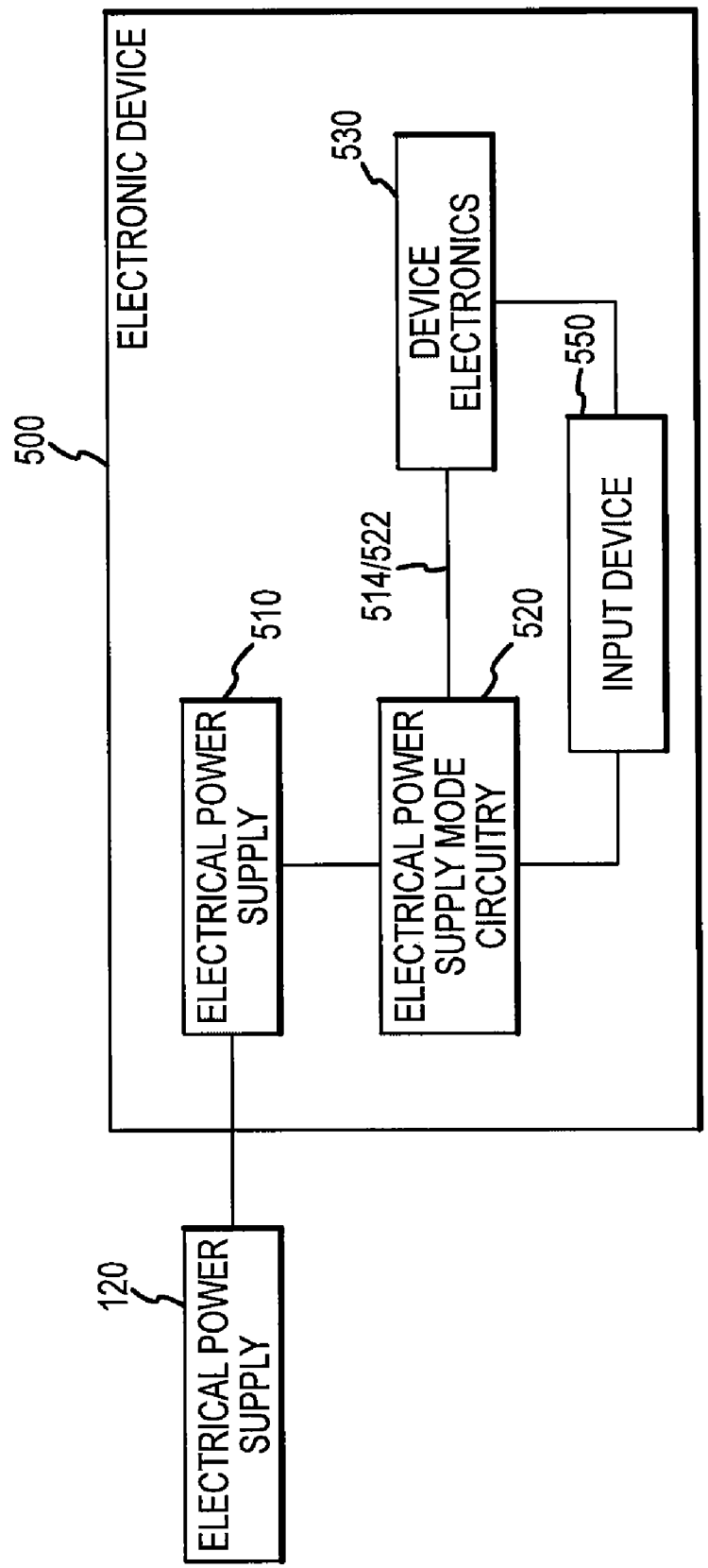
FIG. 5 is another block diagram of an electronic device that may be employed in systems and methods described herein.

FIG. 5 is another block diagram of an electronic device 500 that may be employed in systems and methods described herein. The electronic device 500 may include an electrical power supply 510, electrical power supply mode circuitry 520 and device electronics 530. The electronic device 500 differs from the electronic devices 200 and 300 described above by also including an input device 550. Although the input device 550 is shown separate from the device electronics 530 for the sake of explanation, it should be understood that the device electronics 530 may include such an input device 550, as appropriate or desired.

The input device 550 may be any suitable device configured to receive input from another source. For example, a variety of user inputs may be envisioned for the input device 550, such a buttons, switches, touch screens, wireless receivers for receiving signals from remote control electronics, and the like. Further, a variety of input devices for receiving input from other electronic devices may be envisioned, including without limitation, any suitable communication interface, connector or port that is configured to receive a signal.

Based on input received, the input device 550 may provide a signal to change the mode of operation and/or the state of the device electronics 530/the electronic device 500, and/or to cause the device electronics 530 to perform one or more operations. The input device 550 may also be configured to send corresponding signals to the electrical power supply mode circuitry 520.

As discussed above, the electrical power supply mode circuitry 520 may be configured to select between the plurality of power modes of the electrical power supply 510. In this example, the electrical power supply mode circuitry 520 may select or otherwise control the power mode in which the electrical power supply 510 operates based on signals received from the input device 550. As the input device 550 may receive input to control the modes, states and/or operations of the device electronics 530/the electronic device 500, the input device 550 may be particularly suited to provide signals to the electrical power supply mode circuitry 520 for determining the power mode in which the electrical power supply 510 is to operate. In other words, the input device 550 may provide the same or corresponding signals to the electrical power supply mode circuitry 520 when the input device 550 sends a signal to the device electronics 530 to change mode and/or state, as well as when the input device 550 sends a signal to the device electronics 530 to begin an operation and either sends a signal to the device electronics 530 to end the operation or the electrical power supply mode circuitry 520 receives a signal from the device electronics 530 indicating completion of the operation, either via an electrical connection or communication link 514, configured to provide electrical power to the device electronics 530, or a separate electrical connection or communication link 522.

Figure 6:
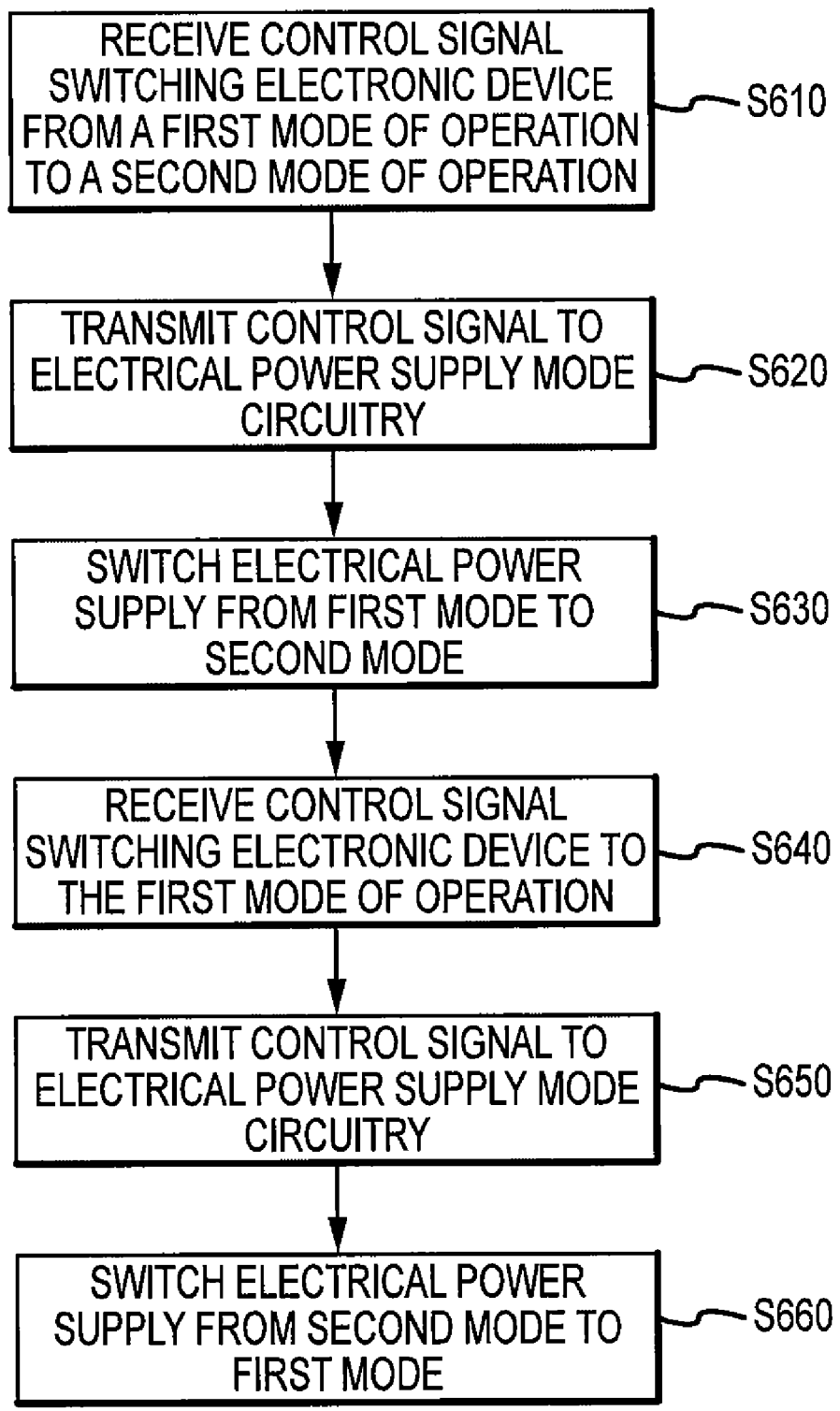
FIG. 6 is a flowchart illustrating a method of controlling power consumption of an electrical power supply of an electronic device by switching modes of the electrical power supply.

FIG. 6 is a flowchart illustrating a method of controlling power consumption of an electrical power supply of an electronic device by switching modes of the electrical power supply. The flowchart of FIG. 6 begins with the electronic device in a first mode of operation, such as an on mode, and transitions to a second mode, such as an off mode or a standby mode. However, it should be understood that the electronic device may be in any particular mode at a given time, and may transition between more than two different modes, as appropriate or desired.

Control may begin in S610, where a control signal switching the electronic device from a first mode (e.g., on mode) of operation to a second mode (e.g., standby mode) of operation. That control signal or a corresponding control signal may be transmitted to the electrical power supply mode circuitry in S620. Upon receipt of the signal, the electrical power supply mode circuitry may switch the electrical power supply from a first power mode (e.g., full-power mode) to a second power mode (e.g., a low-power mode) in S630. By switching the power mode of the electrical power supply, the amount of power consumed by the electrical power supply draw from the electrical power source may be reduced when the electronic device transitions into a mode requiring less power.

While in the second mode of operation, the electronic device may receive a control signal switching the electronic device from the second mode (standby mode) of operation to the first mode (on mode) of operation in S640. That control signal or a corresponding control signal may be transmitted to the electrical power supply mode circuitry in S650. Upon receipt of the signal, the electrical power supply mode circuitry may switch the electrical power supply from the second power mode (low-power mode) to the first power mode (full-power mode) in S660. By switching the power mode of the electrical power supply upon receipt of the signal, the electrical power supply may be kept in the second power mode (low-power mode) until the electronic device transitions into a mode requiring more power.

Figure 7:
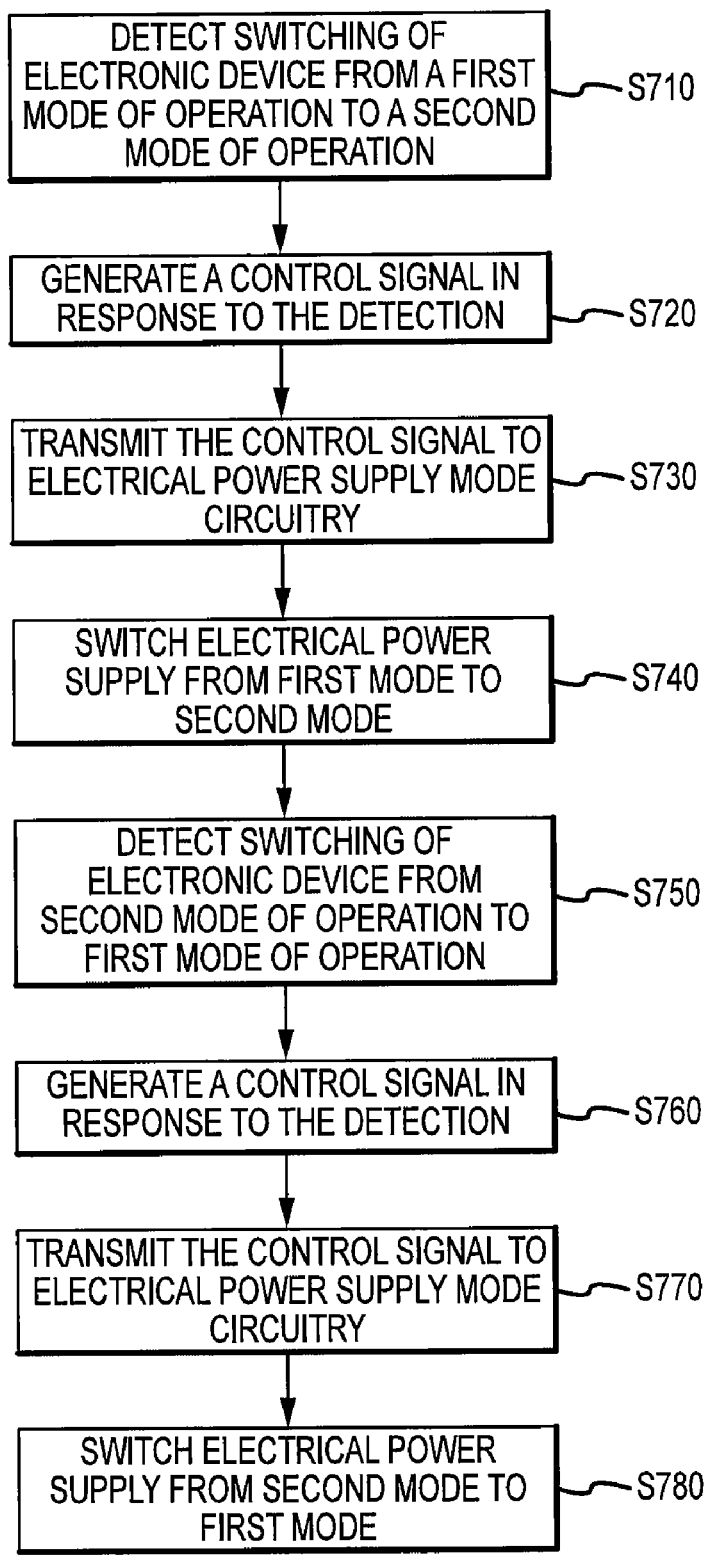
FIG. 7 is a flowchart illustrating another method of controlling power consumption of an electrical power supply of an electronic device by switching modes of the electrical power supply.

FIG. 7 is a flowchart illustrating another method of controlling power consumption of an electrical power supply of an electronic device by switching modes of the electrical power supply. As with the flowchart of FIG. 6, this flowchart begins with the electronic device in a first mode of operation, such as an on mode, and transitions to a second mode, such as an off mode or a standby mode. Again, it should be understood that the electronic device may be in any particular mode at a given time, and may transition between more than two different modes, as appropriate or desired.

The flowchart of FIG. 7 differs from the flowchart of FIG. 6 in that switching of the electronic device from a first mode (e.g., on mode) of operation to a second mode (e.g., standby mode) of operation is detected in S710, rather than receiving a signal that switches the electronic device mode of operation (S610). In response to detecting the switching of the electronic device from the first mode of operation to the second mode of operation, a control signal may be generated in S720. The generated control signal may be transmitted to the electrical power supply mode circuitry in S730. Upon receipt of the signal, the electrical power supply mode circuitry may switch the electrical power supply from a first power mode (e.g., full-power mode) to a second power mode (e.g., a low-power mode) in S740. As above, by switching the power mode of the electrical power supply, the amount of power consumed by the electrical power supply draw from the electrical power source may be reduced when the electronic device transitions into a mode requiring less power.

While in the second mode of operation, switching of the electronic device the electronic device from the second mode (standby mode) of operation to the first mode (on mode) of operation may be detected in S750. In response to detecting the switching of the electronic device from the second mode of operation to the first mode of operation, a control signal may be generated in S760. The generated control signal may be transmitted to the electrical power supply mode circuitry in S770. Upon receipt of the signal, the electrical power supply mode circuitry may switch the electrical power supply from the second power mode (low-power mode) to the first power mode (full-power mode) in S780. As above, by switching the power mode of the electrical power supply upon receipt of the signal, the electrical power supply may be kept in the second power mode (low-power mode) until the electronic device transitions into a mode requiring more power.

Figure 8:
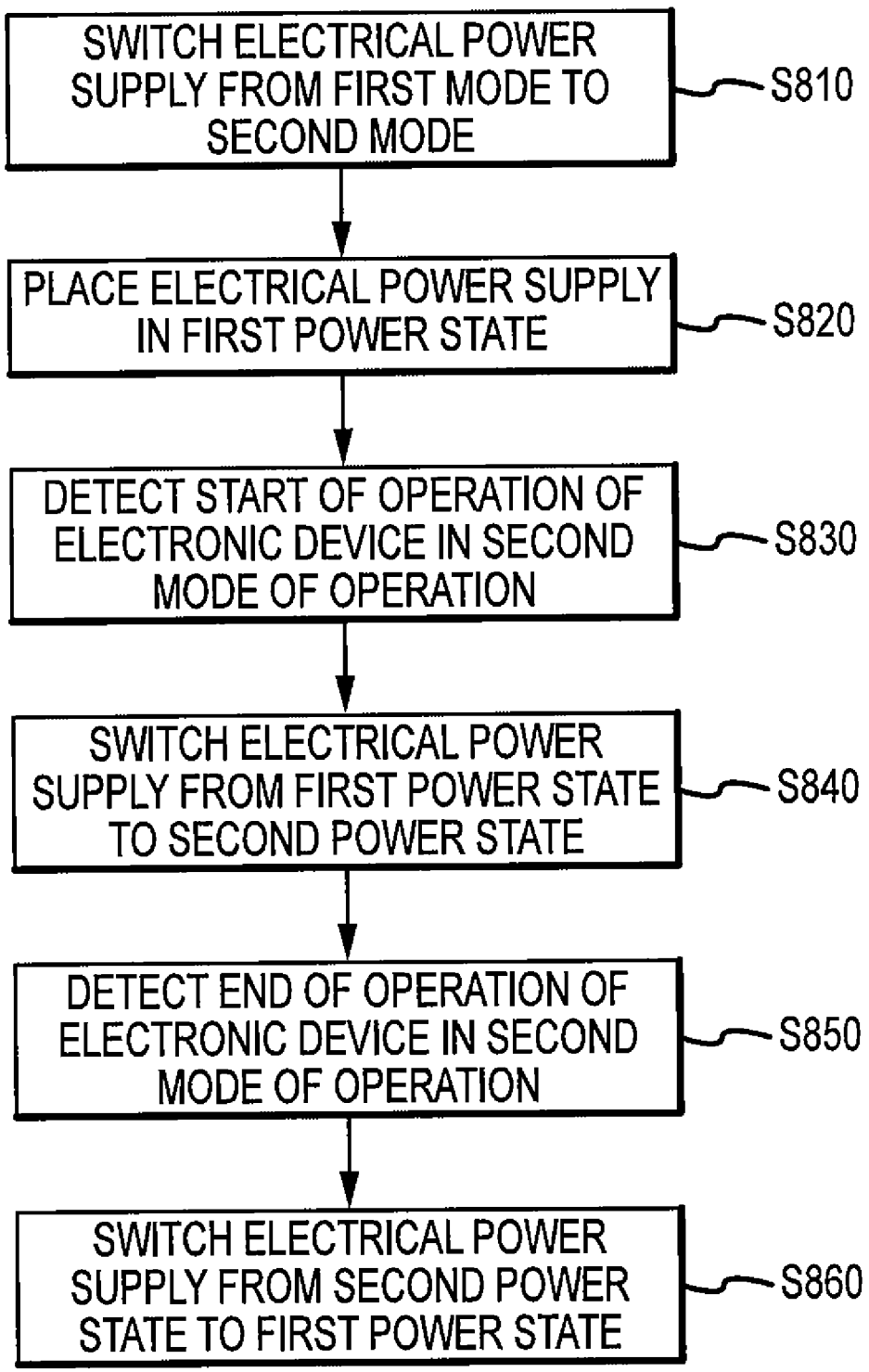
FIG. 8 is a flowchart illustrating a method of controlling power consumption of an electrical power supply of an electronic device by switching power states of the electrical power supply while in a second mode.

FIG. 8 is a flowchart illustrating a method of controlling power consumption of an electrical power supply of an electronic device by switching power states of the electrical power supply while in a second power mode. For example, the second power mode may be a standby mode in which the of the electrical power supply has at least two states. It should be understood that it is possible for a particular power mode to have more than two states, for example, depending on a desired number of power draw fluctuations of the electrical power supply is desired while remaining in a same power mode rather than changing power modes of the electrical power supply.

Control in the flowchart of FIG. 8 begins in S810, where the electrical power supply is switched from a first power mode (e.g., full-power mode) to a second power mode (e.g., low-power mode). As should be understood, this may be accomplished, for example, as outlined by S610-S630 in FIG. 6 or S710-S740 in FIG. 7. When the electrical power supply is switched to the second power mode, in S820 the electrical power supply may be placed in a first power state of that mode. The first power state may be, for example, a lowest power state of that power mode and may be a default upon switching into that power mode.

While in the first power state of the second power mode, a start of an operation of the electronic device may be detected in S830. Alternatively, a signal may be sent to the electrical power supply mode circuitry indicating the start of the operation. In response to the detection and/or a corresponding signal, in S840 the electrical power supply may be switched from the first power state to a second, higher power state in which the electrical power supply is configured to draw more power to meet the anticipated or known demand of the device electronics for performing the operation.

Then, in S850, an end of the operation may be detected. Alternatively, a corresponding signal may be received indication the end of the operation. In either case, based on the detection or signal, the electrical power supply may be switched from the second power state back to the first, lower power state to reduce the power draw by the electrical power supply as it no longer needs to meet the increased demand of the device electronics fro performing the operation.

It should be understood that the flowcharts of FIGS. 6-8 are only examples, and that other methods, whether by addition of operations, omission of operations, and/or reordering of operations, may be envisioned. For example, the flowcharts of FIGS. 6-8 do not illustrate various "starting" configurations of the mode(s) or state(s) of the electronic device that are possible. Further, it should be understood that these basic concepts and principles may be expanded to provide any suitable flow of operations as may be determined to be appropriate or desired for a given embodiment of an electronic device based on the description provided herein.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A method of controlling power consumption of an electrical power supply of an electronic device, the method comprising:
   receiving power at an electrical power supply;
   distributing power from the electrical power supply to device electronics across a power distribution network;
   generating a control signal at the device electronics to switch the electronic device between first and second modes of operation;
   sending the control signal across a portion of the power distribution network;
   receiving the control signal from across the power distribution network portion at a power supply mode circuitry; and
   switching the electrical power supply, by the power supply mode circuitry, between corresponding first and second modes based on the received control signal, the electrical power supply configured to draw different amounts of power in the first and second modes.

2. The method of claim 1, wherein the first mode of operation of the electronic device is an on mode and the second mode of operation of the electronic device is one of an off mode and a standby mode.

3. The method of claim 1, wherein the first mode of operation of the electronic device is an on mode and the second mode of operation of the electronic device is one of a sleep mode and a vacation mode.

4. The method of claim 1, wherein the first mode of the electrical power supply is a full-power mode and the second mode of the electrical power supply is a reduced-power mode.

5. The method of claim 4, wherein the electrical power supply has at least a first power state in the first mode and has a second power state and a third power state in the second mode, the method further comprising switching the electrical power supply between the second power state and the third power state based on performance of an operation by the electronic device in the second mode of operation.

6. The method of claim 5, wherein the electrical power supply is configured to draw a relatively low amount of power in the second power state and is configured to draw an amount of power in the third state greater than the relatively low amount of power drawn in the second power state.

7. An electrical power supply for supplying electrical power to an electronic device, the electrical power supply comprising:
   an electronic power supply source configured to receive electrical power and to distribute the electrical power to the electronic device across a power distribution network;
   power supply mode circuitry configured to receive a control signal from across the power distribution network and to place the electrical power supply into one of at least two power modes in response to the control signal, the at least two power modes including a first power mode in which the power supply is configured to draw a first amount of power and a second power mode in which the power supply is configured to draw a second amount of power less than the first amount of power.

8. The electrical power supply of claim 7, wherein the first power mode is a full-power mode and the second power mode is a reduced-power mode.

9. The electrical power supply of claim 7, wherein the power mode circuitry is configured to switch the electrical power supply between power modes based on a first control signal from the electronic device.

10. The electrical power supply of claim 9, wherein the electrical power supply has at least a first power state in the first power mode and has a second power state and a third power state in the second power mode, the power supply mode circuitry being configured to switch the electrical power supply between the second power state and the third power state based on a second control signal from the electronic device.

11. The electrical power supply of claim 10, wherein the electrical power supply is configured to draw a relatively low amount of power in the second power state and is configured to draw an amount of power in the third state greater than the relatively low amount of power drawn in the second power state.

12. An electronic device, comprising:
an electrical power supply configured to receive electrical power and to distribute the electrical power across a power distribution network;
power supply mode circuitry configured to selectively place the power supply into one of a plurality of power modes in which the electrical power supply is configured to draw different amounts of power; and
circuitry configured to generate a first control signal and to send the first control signal to the power supply mode circuitry across the power distribution network;
wherein the power supply mode circuitry is configured to selectively place the electrical power supply into one of the plurality of power modes based on the first control signal.

13. The electronic device of claim 12, further comprising communication circuitry configured to provide a signal based on the first control signal to the power supply mode circuitry.

14. The electronic device of claim 12, wherein the circuitry is configured to generate the first control signal based on the electronic device being switched between a first mode of operation and a second mode of operation in which the electronic device is configured to perform fewer operations that in the first mode of operation.

15. The electronic device of claim 14, wherein the first mode of operation is an on mode and the second mode of operation is one of an off mode and a standby mode.

16. The electronic device claim 14, wherein the first mode of operation is an on mode and the second mode of operation is one of a sleep mode and a vacation mode.

17. The electronic device of claim 13, wherein the electrical power supply has at least a first power state in the first mode and has a second power state and a third power state in the second mode, the controller being configured to generate a second control signal based on performance of an operation by the electronic device in the second mode of operation, the communication circuitry being configured to provide the second control signal from the controller to the power supply mode circuitry, the power supply mode circuitry placing the electrical power supply into one of the second power state and the third power state based on the second control signal.

18. The electronic device of claim 17, wherein the electrical power supply is configured to draw a relatively low amount of power in the second power state and is configured to draw an amount of power in the third state greater than the relatively low amount of power drawn in the second power state.

* * * * *